United States Patent [19]

Heise

[11] Patent Number: 4,784,596

[45] Date of Patent: Nov. 15, 1988

[54] CALENDERING APPARATUS

[75] Inventor: Wolfgang Heise, Hanover, Fed. Rep. of Germany

[73] Assignee: Hermann Berstorff Maschinenbau GmbH, Hanover, Fed. Rep. of Germany

[21] Appl. No.: 134,809

[22] Filed: Dec. 18, 1987

[30] Foreign Application Priority Data

Dec. 19, 1986 [DE] Fed. Rep. of Germany ....... 3643455

[51] Int. Cl.⁴ ..................... B29C 43/24; B29C 43/46
[52] U.S. Cl. ..................................... 425/186; 72/239;
100/162 R; 100/168; 100/176; 425/194;
425/367; 425/394; 425/409
[58] Field of Search ............... 425/383, 384, 385, 186,
425/194, 327, 363, 367, 335, 394, 337, DIG.
237, 409; 100/176 X, 168, 162 R; 72/239 X

[56] References Cited

U.S. PATENT DOCUMENTS

| | | | |
|---|---|---|---|
| 2,815,531 | 12/1957 | Stewart | 425/194 |
| 3,346,913 | 10/1967 | Lake et al. | 425/194 |
| 3,570,054 | 3/1971 | Seanor et al. | 425/DIG. 235 |
| 3,577,758 | 5/1971 | Adair | 72/239 |
| 3,581,340 | 6/1971 | Thieme | 425/385 |
| 3,782,161 | 1/1974 | McGeeney et al. | 72/239 |
| 3,866,455 | 2/1975 | Petros | 72/239 |
| 4,015,919 | 4/1977 | Pawelczyk | 425/367 |
| 4,074,558 | 2/1978 | Dim | 72/239 |
| 4,408,974 | 10/1983 | Comerio | 425/194 |
| 4,519,757 | 5/1985 | Wittkopf et al. | 425/194 |
| 4,655,703 | 4/1987 | Heise | 425/325 |
| 4,695,239 | 9/1987 | Klepsch et al. | 425/194 |

FOREIGN PATENT DOCUMENTS 3506256 6/1986 Fed. Rep. of Germany .

*Primary Examiner*—Willard Hoag
*Attorney, Agent, or Firm*—Foley & Lardner, Schwartz, Jeffery, Schwaab, Mack, Blumenthal & Evans

[57] ABSTRACT

A calendering apparatus is disclosed which includes means for replacing a desired take-up roller from a take-up roller train. Displaceable, bifurcated carrier means are disposed on the embossing means forming part of the calender apparatus, which carriers can accommodate individual take-up rollers. The rollers are then moved out of the train by such carriers. The embossing means are also displaceable into a position in a lifting mechanism which can be used to collect the roller from the carrier.

7 Claims, 2 Drawing Sheets

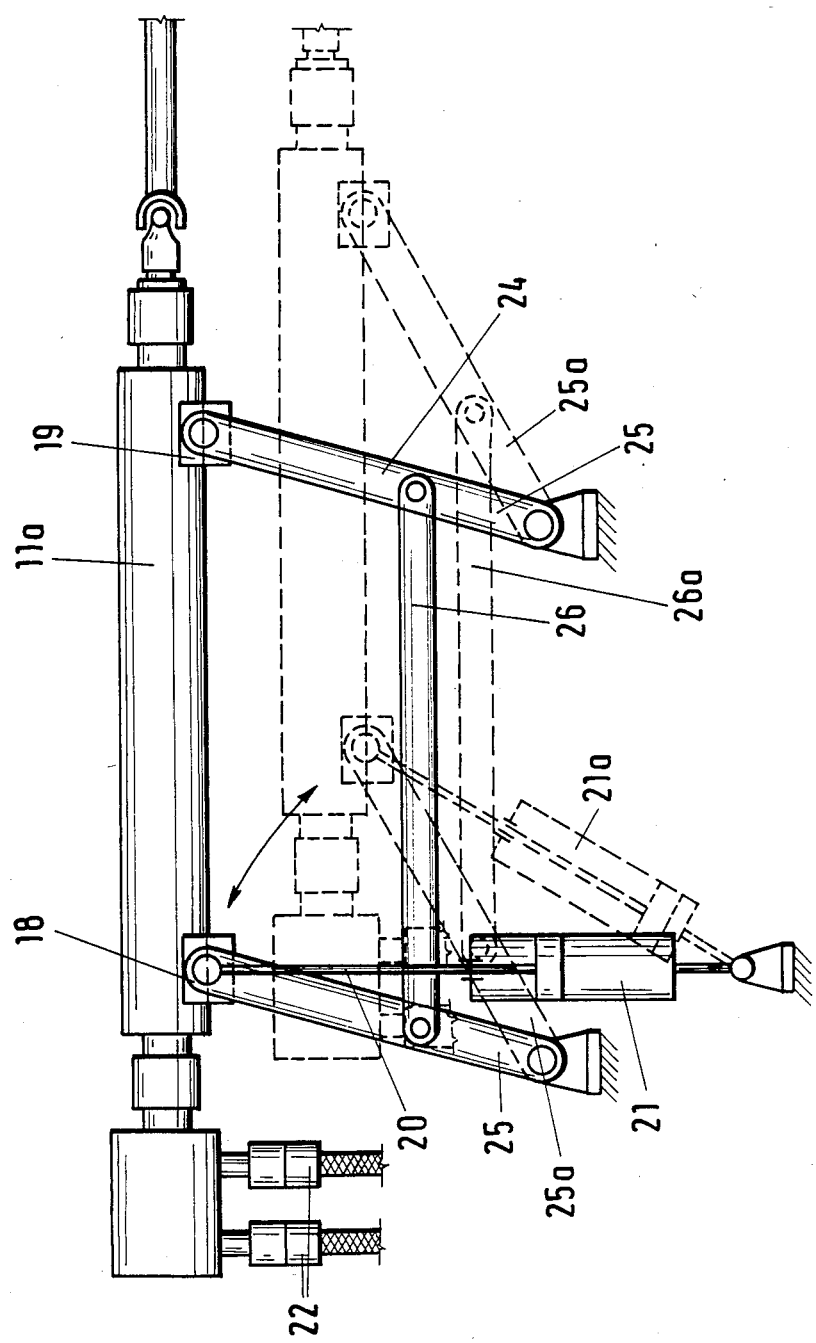

CALENDERING APPARATUS

FIELD OF THE INVENTION

The present invention relates to a calendering apparatus in which means are provided for replacing rollers of a take-up roller train. More particularly, the present invention relates to an apparatus which enables any desired roller in the train to be removed and/or replaced without necessitating the disruption of any of the other rollers.

BACKGROUND OF THE INVENTION AND PRIOR ART DISCUSSION

Thermoplastic plastics films, such as polyvinyl chloride films are often produced on so-called "F-calenders". An "F-calenders" comprises three calendering rollers disposed vertically above one another in a support column and a fourth calendering roller disposed in the same horizontal plane as the uppermost roller of the set of three rollers. This fourth roller may be either in front of or behind the uppermost roller.

The strand-like polyvinyl chloride material to be processed into a film is fed into the nip between the two rollers disposed adjacent one another in the same horizontal plane. The material passes through the nips between the three rollers disposed vertically above one another. The film which is produced thus loops around at least a portion of each roller.

From the lowermost roller of the F-calender, the film—is collected by a take-up roller train, comprising a plurality of take-up rollers. In the take-up roller train, the film is stretched to up to twice its original dimension.

The take-up rollers are each individually driven and heated by means of a circulating medium, such as water or oil. The take-up rollers generally have a diameter of between 150 and 200 mm and a length of between 2,200 and 2,600 mm, the actual dimensions depending upon the working width of the calender rollers. Because of their weight and dimensions, such take-up rollers can only be removed by a lifting mechanism. This removal is necessary when it is desirable, for example, to employ rollers with a different surface, that is to say, having a different peak-to-valley height, or when the heads of the circulation system for the temperature-controlling medium start leaking, or when bearings become damaged.

Individual take-up rollers are very difficult to replace and the process is extremely time-consuming. This is because, especially in the case of an F-calender, it has hitherto been impossible to use a lifting mechanism in view of the fact that the fourth roller, including its bearing and its adjustment means, is disposed vertically above the take-up roller train. In consequence, the take-up roller cannot be raised and removed in an upward direction.

Hitherto, therefore, the removal of an individual take-up roller has been effected by slightly raising both ends of the roller at its journals by means of lifting trucks or the like. The drive coupling rod at one end of the roller journal and the snap coupling for the circulating temperature-controlling medium at the other end are then released. It is then necessary for a long guide and support bar to be slipped beneath the appropriate take-up roller, so that the roller can be withdrawn laterally from the region of the calender support columns on such bar. Such a removal process means that the entire calender line is out of action for a relatively long time. Moreover, damage may be caused to the extremely delicate shell of the take-up roller.

An L-calender is disclosed in U.S. Pat. No. 3,581,340. This calender includes a take-up roller train disposed on the final calender roller when viewed in the operating direction. In such an arrangement, the take-up roller train and the embossing means are disposed on a displaceable truck. However, such prior document does not disclose any means for removing individual take-up rollers from the calender support columns, and it must therefore be assumed that the removal process described hereinbefore still has to be effected.

An F-calender is also described in German Pat. Specification No. 3 506 256. Such calender also has a take-up roller train disposed after the final calender roller, when viewed in the operating direction. A displaceable and pivotable embossing means is disposed downstream of the take-up roller train when viewed in the operating direction. Again, however, no means for removing individual take-up rollers from the take-up roller train are disclosed in this prior publication.

OBJECT OF THE INVENTION

The invention seeks to provide an apparatus for removing and replacing individual take-up rollers in a take-up roller train on a calender and which permits such removal and replacement to be effected quickly without risking damage being sustained by the calender arrangement.

SUMMARY OF THE INVENTION

According to the present invention, there is provided a calerdering apparatus for producing thermoplastic plastics material films comprising a plurality of calender rollers, a take-up roller train and embossing means sequentially traversed by the material used for producing the film, and means for replacing at least one roller in said take-up roller train, wherein said embossing means comprises a plurality of embossing rollers disposed axially parallel to one another, said axes extending transversely to the direction of feed of said material to said embossing means, support means disposed laterally of said embossing rollers, means for displaying said support means to beneath said take-up roller train, and carrier means for receiving said at least one roller to be replaced displaceably mounted on said support means.

The provision of carrier means at, or on, the support assembly for the rollers of the embossing means and the fact that the support assembly is displaceable means that the assembly can be displaced to beneath the particular roller to be removed and then the carrier means can be raised so as to contact the shell of the roller. The carrier means, which are preferably in the form of pairs of bifurcated holder members, cradle the roller and ensure that it is guided positively.

In many cases, the embossing means is obstructed from travelling to a position beneath the initial take-up roller of the roller train, that is to say, the roller nearest the calender rollers. Accordingly, two pairs of holders are advantageously provided, one pair at each end of the support assembly. In such a case, the pair of holders nearer the calender rollers are desirably made horizontally displaceable to a position below initial take-up roller by means of hydraulic or pneumatic cylinders. Once in the desired horizontal position, the pair of holders are then raised, by either hydraulically or pneumatically-actuated means until they contact the shell of the take-up roller.

To prevent the extremely delicate shells of the take-up rollers from becoming damaged, it is preferred if the pair of bifurcated holders of the or each carrier means are either coated with polytetrafluoroethylene or formed entirely from such material.

By providing carrier means on both ends of the support assembly for the embossing rollers, that is to say, on the end thereof facing the calender and on the opposite end facing away from the calender, and by mounting the assembly on wheels which are displaceable on rails, the embossing means itself only needs to be moved through a short distance in order to position a pair of holders beneath a take-up roller which is to be replaced. In addition, the holders facing the calender can still be horizontally displaced so as to be in position to pick up the initial take-up roller.

One end of the roller to be replaced is connected to a drive by a coupling rod. The other end of the roller is provided with a snap closure for the supply and discharge of a medium controlling the temperature of the roller. Both of these connections are disconnected once the roller to be replaced is located on the carrier means.

In a preferred embodiment of the invention, the pair of holders forming each retaining means are adapted to be pivoted to one side and downwardly, whilst still retaining the horizontal disposition of the roller. This is achieved by means of a pneumatically or hydraulically operated parallel linkage assembly.

This advantageous embodiment permits the take-up roller, after it has been released from its connections at both of its ends, to be moved in an unhindered manner, both downwardly and to one side, whilst still in a horizontal disposition. The roller is carried past the temperature-controlling medium connections, disposed one behind the other, for the rollers which are not being replaced. The roller which is located on the holders is moved away from the calendar, by displacement of the embossing means, to such an extent that a lifting mechanism can now be used to grasp the roller from above and replace it with a different roller.

BRIEF DESCRIPTION OF THE DRAWINGS

A preferred embodiment of an apparatus for removing take-up rollers from a roller train in a calendar in accordance with the present invention will be further described, by way of example, with reference to the accompanying drawings, in which:

FIG. 2 is a schematic front elevational view of a parallel crankshaft arrangement provided on two receiving holders for permitting lateral and downward pivotal movement of a take-up roller shown in FIG. 1.

DESCRIPTION OF PREFERRED EMBODIMENT

Figure 1:
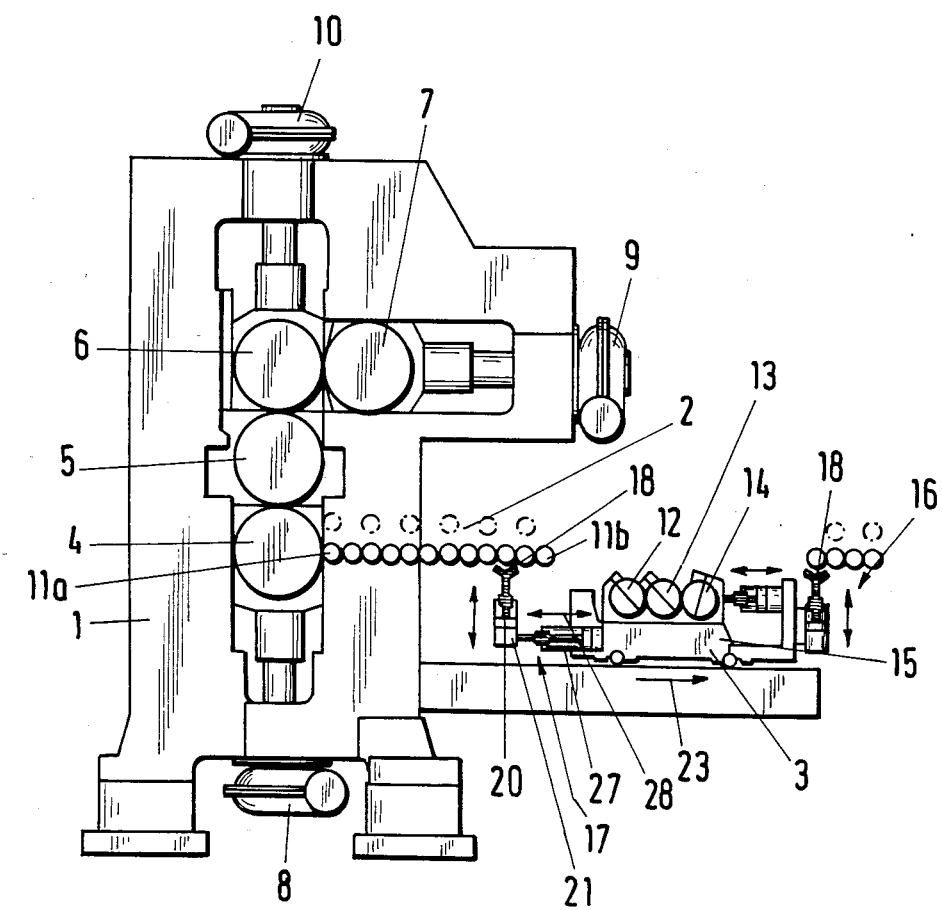
FIG. 1 is a schematic, longitudinal sectional view through a four-roller F-calendar incorporating a take-up roller train and an embossing arrangement.

In FIG. 1, there is shown a four-roller F-calender 1. The calender 1 comprises three rollers 4, 5 and 6, which are disposed vertically above one another, and a further roller 7 which is disposed horizontally in front of the uppermost roller 6. The rollers 4, 6 and 7 are each individually adjustable by means of control gears 8, 10 and 9 respectively so that plastics material films of different thicknesses can be produced.

Located downstream of the final calendar roller 4, in the direction of travel of the material being calendered is a take-up roller train 2. In this embodiment the take-up roller train 2 comprises twelve individual take-up rollers 11, every alternate roller being raisable by means (not shown) into the positions indicated in dotted lines in FIG. 1 so that the plastics film to be stretched can be better aligned. The initial take-up roller encountered by the film is referenced 11a, and the final take-up roller is referenced 11b.

After passing over the take-off rollers 2, the material is transferred to an embossing device 3 which comprises three sequentially traversed rollers 12, 13 and 14. Each roller 12, 13 and 14 has bearings at each of its ends and these bearings are mounted in support columns 15. The final roller 14 is displaceable transversely relative to the calender by means of a hydraulic cylinder. Carrier means 16 and 17 are disposed on opposed ends of the support column 15, the carrier means 17 being disposed nearer the calender 1 and the carrier means 16 further therefrom. The embossing device 3 is displaceable on wheels or rollers towards and away from the calendar 1.

As illustrated in FIG. 2, each carrier means comprises two bifurcated holders 18 and 19 which can be raised and lowered by means of the piston rod 20 of a hydraulically actuated piston and cylinder arrangement 21. For the sake of clarity, the right-hand piston and cylinder arrangement of the pair which would otherwise be seen has been omitted from FIG. 2. These carrier blocks are either made from polytetrafluoroethylene or are provided with a coating of polytetrafluoroethylene, such as is marketed under the Registered Trade Mark "Teflon".

It will be assumed that the take-up roller 11a is to be replaced and that the connections for the medium controlling the temperature of this roller have previously been released by means of the snap closure coupling 22. Moreover, it will also be assumed that the roller has been disconnected from its drive coupling rod. If the piston rods 20 are lowered into their respective cylinders 21, the roller 11a will pivot into the position shown by dotted lines in FIG. 2. From FIG. 2, it will be noted that the roller 11a executes a lateral, as well as a downward movement. This is achieved by providing a linkage arrangement comprising two parallel lateral arms 25 joined by a substantially horizontally extending connecting rod 26. Each arm 25 is pivotally connected to one of the holders 18 or 19. By displacing the embossing means 3 on its wheels or rollers in the direction of arrow 23 shown in FIG. 1, the take-up roller 11a in its carriers can be moved in an unobstructed manner past the couplings (not shown) for the other take-up rollers which are disposed behind the snap closure couplings 22. The roller 11a can then be raised by means of a lifting mechanism and replaced or removed.

In the embodiment illustrated, in order to permit the initial roller 11a to be collected and carried by the carrier means and replaced, the hydraulic piston and cylinder arrangements 21, which are mounted at each side of the support columns 15, are moved in the direction of arrow 28 until they are disposed beneath the initial take-up roller 11a. Such displacement is effected by means of two additional horizontally acting hydraulic piston and cylinder arrangements 27. Only then are the two bifurcated holders 18 and 19 raised to contact the shell of the take-up roller 11a by means of the hydraulic piston and cylinder arrangements 21 to permit the replacement process described hereinbefore to be effected.

I claim:

1. A calendering apparatus for producing thermoplastic plastic material films comprising a plurality of calender rollers, a take-up roller train and embossing means sequentially traversed by the material used for producing the film, and means for replacing at least one roller in said take-up roller train, wherein said embossing means comprises a plurality of embossing rollers disposed axially parallel to one another, said axes extending transverely to the direction of feed of said material to said embossing means, support means disposed laterally of said embossing rollers, means for displacing said support means to beneath said take-up roller train, carrier means for receiving said at least one roller to be replaced displaceably mounted on said support means.

2. A calendering apparatus as recited in claim 1, wherein said support means includes opposed first and second end regions, said first end region facing said calender rollers and said second end region facing away from said calender rollers, each said end region including said carrier means.

3. A calendering apparatus as recited in claim 1 wherein each said carrier means comprises at least two bifurcated support holders for supporting said at least one take-up roller to be replaced.

4. A calendering apparatus as recited in claim 3 wherein said support holders comprise polytetrafluoroethylene blocks.

5. A calendering apparatus as recited in claim 3 wherein said support holders comprises blocks, said blocks carrying a coating of polytetrafluoroethylene.

6. An apparatus as recited in claim 2 additionally comprising means for horizontally displacing said carrier means of said first end region in a direction towards and away from said calender rollers and means for vertically displacing said carrier means of said first end region, wherein both said displacement means comprises hydraulically or pneumatically actuated piston and cylinder arrangements.

7. An apparatus as recited in claim 2 wherein each said carrier means comprises at least two bifurcated support holders for suporting said at least one take-up roller to be replaced and additionally comprising a linkage arrangement interconnecting said two bifurcated support holders, said linkage arrangement including drive means, said drive means comprising pneumatically or hydraulically actuated piston and cylinder arrangements so as to permit each said carrier means to be displaced unilaterally in both vertical and horizontal directions.

* * * * *